US011657218B2

(12) United States Patent
Rasmussen et al.

(10) Patent No.: US 11,657,218 B2
(45) Date of Patent: May 23, 2023

(54) CUSTOM TEMPLATE GENERATION USING UNIVERSAL CODE

(71) Applicant: Solver, Inc., Los Angeles, CA (US)

(72) Inventors: Nils Rasmussen, Santa Monica, CA (US); Paul Richard Zunker, Mill Creek, WA (US); Michael Applegate, Porter Ranch, CA (US)

(73) Assignee: Solver, Inc., Los Angeles, CA (US)

( * ) Notice: Subject to any disclaimer, the term of this patent is extended or adjusted under 35 U.S.C. 154(b) by 0 days.

(21) Appl. No.: 17/699,465

(22) Filed: Mar. 21, 2022

(65) Prior Publication Data
US 2022/0374593 A1 Nov. 24, 2022

Related U.S. Application Data

(60) Provisional application No. 63/191,667, filed on May 21, 2021.

(51) Int. Cl.
*G06F 40/186* (2020.01)
*G06F 16/25* (2019.01)
*G06F 3/0486* (2013.01)
*G06F 3/0482* (2013.01)

(52) U.S. Cl.
CPC .......... *G06F 40/186* (2020.01); *G06F 3/0482* (2013.01); *G06F 3/0486* (2013.01); *G06F 16/258* (2019.01)

(58) Field of Classification Search
CPC .... G06F 3/0482; G06F 3/0486; G06F 16/258; G06F 40/186
See application file for complete search history.

(56) References Cited

U.S. PATENT DOCUMENTS

| | | | | |
|---|---|---|---|---|
| 2006/0129914 A1* | 6/2006 | Ellis | ...................... | G06F 3/04847 715/275 |
| 2009/0063646 A1* | 3/2009 | Mitnick | ................... | G06F 16/29 707/999.01 |
| 2011/0218983 A1* | 9/2011 | Chaney | ................. | G06F 16/686 707/705 |
| 2017/0102839 A1* | 4/2017 | Nadella | .............. | G06Q 30/0641 |
| 2019/0295094 A1* | 9/2019 | Arora | ................. | G06Q 20/3223 |
| 2022/0012773 A1* | 1/2022 | Lee | ...................... | G06F 21/6245 |

* cited by examiner

*Primary Examiner* — Seth A Silverman
(74) *Attorney, Agent, or Firm* — Stetina Brunda Garred and Brucker (57) ABSTRACT

A method of generating a custom template includes importing user account data including a plurality of user-defined account identifiers, receiving a user input on a graphical user interface including a mapping of the plurality of user-defined account identifiers to predetermined categories and a selected ordering of two or more of the user-defined account identifiers that are mapped to the same one of the predetermined categories, for each of the user-defined account identifiers, generating a code defining the predetermined category to which the user-defined account identifier is mapped and an order ranking of the user-defined account identifier relative to any others of the user-defined account identifiers that are mapped to the same predetermined category, and generating one or more templates comprising a representation of at least a portion of the user account data organized according to the predetermined categories and order rankings defined by one or more of the codes.

20 Claims, 7 Drawing Sheets

| | | 200 | INTEGRATION WIZARD STEP 3 | ← 210 | |
|---|---|---|---|---|---|
| | 231 | 230 | Map your chart of accounts | | 232 |

| | | Category Code | Category Description | Display Order ⓘ |
|---|---|---|---|---|
| Balance Sheet | | | | BS |
| ▶ Assets | | | ⌄ Drag item from sidebar and drop below to order accounts ⌄ | BS.11 |
| ▦ Current Assets | | | ⌄ Drag item from sidebar and drop below to order accounts ⌄ | BS.11.AA |
| 241 ⟵ | ▤ | CASH | Cash | ✕ |
| | ▤ | INVENTORY | Inventory | ✕ |
| ▦ Noncurrent Assets | | | ⌄ Drag item from sidebar and drop below to order accounts ⌄ | BS.11.BB |
| ▶ Liabilities | | | ⌄ Drag item from sidebar and drop below to order accounts ⌄ | BS.33 |
| ▦ Current Liabilities | | | ⌄ Drag item from sidebar and drop below to order accounts ⌄ | BS.33.AA |
| ▦ Noncurrent Liabilities | | | ⌄ Drag item from sidebar and drop below to order accounts ⌄ | BS.33.BB |
| ▶ Owners Equity | | | ⌄ Drag item from sidebar and drop below to order accounts ⌄ | BS.66 |
| | ▤ | COMMONSTOCK | Common Stock | ✕ |
| 241 ⟵ | ▤ | RETAINEDEARNINGS | Retained Earnings | ✕ |
| | ▤ | DISTRIBUTIONSTOSHAREHOLDERS | Distributions to Shareholders | ✕ |

CUSTOM TEMPLATE GENERATION USING UNIVERSAL CODE

CROSS-REFERENCE TO RELATED APPLICATIONS

This application relates to and claims the benefit of U.S. Provisional Application No. 63/191,667, filed May 21, 2021, the entire contents of which is expressly incorporated by reference herein.

STATEMENT RE: FEDERALLY SPONSORED RESEARCH/DEVELOPMENT

Not Applicable

BACKGROUND

While the Corporate Performance Management (CPM) industry is in rapid growth today, it is still a complex and lengthy (2-3 months or more of consulting) implementation in order to design financial reports, a budget model, and financial dashboards for a customer. Furthermore, it typically requires highly trained technical consultants and thus it is almost impossible for a customer to self-implement without any experience. While this cost and risk (of a poorly designed implementation) may be acceptable to enterprise and upper mid-market organizations, it makes CPM solutions largely unaffordable for smaller and mid-market ($20-$150 million in revenues) organizations.

The main reason it takes several months of consulting to configure a CPM solution with financial reports, planning input forms, and dashboards is that every company has a different Chart of Accounts (COA) in their Enterprise Resource Planning (ERP) system, so all the formulas in the reports/forms/dashboards are different for each customer. It is completely up to each finance team to decide which number system to use for their profit & loss and balance sheet accounts, and there is no legal standard they must follow when they implement their ERP system and create the numbering of accounts and the grouping of these accounts into account categories (groupings of one or more accounts). Here is an example of how two different companies may have numbered and grouped their sales accounts in their ERP systems:

Company 1:

| Account | Account Category |
|---|---|
| 3010—Product Sales | 30—Sales Revenues |
| 3011—Services Sales | 30—Sales Revenues |

Company 2:

| Account | Account Category |
|---|---|
| 45780—Product Sales | Prod—Product Sales |
| 45790—Item Sales | Prod—Product Sales |
| 46010—Services Revenue | Serv—Service Income |

As illustrated, to further complicate the lack of standardization in the names/numbers of accounts and account categories, Company 1 above may have two different sales accounts ("Product Sales" and "Services Sales") rolling up to a single revenue account category ("Sales Revenues"), while Company 2 may have three different accounts ("Product Sales," "Item Sales," and "Services Revenue") rolling up into two account categories ("Product Sales" and "Service Income").

Because of the differences between companies in how they use account names and numbers as well as the grouping of these into account categories, CPM software implementations have to be customized for every company, and thus these implementations are both expensive and risky with much of the work depending on the skills of the consultant and the customer's own staff to implement. For this reason, it usually takes several months of work before a customer can use their new CPM solution.

BRIEF SUMMARY

The present disclosure contemplates various systems and methods for overcoming the above drawbacks associated with the related art. One aspect of the embodiments of the present disclosure is a computer program product comprising one or more non-transitory program storage media on which are stored instructions executable by one or more processors or programmable circuits to perform operations for generating a custom template. The operations may comprise importing user account data, the user account data including a plurality of user-defined account identifiers, and receiving a user input on a graphical user interface, the user input including a mapping of the plurality of user-defined account identifiers to predetermined categories, the user input further including a selected ordering of two or more of the user-defined account identifiers that are mapped to the same one of the predetermined categories. The operations may further comprise, for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category. The operations may further comprise generating one or more templates based on the plurality of codes, each of the one or more templates comprising a representation of at least a portion of the user account data organized according to the predetermined categories and order rankings defined by one or more of the codes.

The graphical user interface may comprise a hierarchical listing of the predetermined categories and a listing of the plurality of user-defined account identifiers, the user input being defined at least in part by one or more user interactions with the graphical user interface that designate positions in the hierarchical listing for the listed user-defined account identifiers. The one or more user interactions may comprise a drag-and-drop interaction to move one of the listed user-defined account identifiers to a position in the hierarchical listing. The graphical user interface may use an indented tree structure to differentiate positions in the hierarchical listing that are at different hierarchical levels.

The user input may further include a change to a name or description associated with one of the user-defined account identifiers.

Each of the plurality of codes may include one or more mapping code segments specifying respective hierarchical levels associated with the predetermined category defined by the code and an ordering code segment specifying the order ranking defined by the code.

The operations may comprise storing the plurality of codes in a data warehouse and receiving a request for a template model from among a plurality of template models available in a user-browsable marketplace. The generating of the one or more templates may comprise customizing the template model according to the plurality of codes stored in the data warehouse. The plurality of template models may include one or more template models selected from the group consisting of financial reports, planning models, and dashboards.

The user account data may be imported from one or more data sources including an Enterprise Resource Planning (ERP) system.

The plurality of user-defined account identifiers may include one or more user-defined account identifiers selected from the group consisting of an account name, an account category name, an account category description, and an account category code.

The operations may comprise repopulating the one or more generated templates to reflect updates to the user account data. The repopulating may be performed periodically at predetermined times.

The operations may comprise, after the generating of the one or more templates, importing additional user account data, the additional user account data including one or more additional user-defined account identifiers, and receiving an additional user input on the graphical user interface, the additional user input including a mapping of the one or more additional user-defined account identifiers to the predetermined categories, the additional user input further including a selected ordering of the one or more additional user-defined account identifiers that are mapped to the same one of the predetermined categories as another of the user-defined account identifiers. The operations may comprise, for each of the one or more additional user-defined account identifiers, generating a new code based on the additional user input, the new code defining the predetermined category to which the additional user-defined account identifier is mapped and an order ranking of the additional user-defined account identifier relative to any others of the user-defined account identifiers that are mapped to the same predetermined category. The operations may comprise regenerating the one or more templates based on the plurality of codes including the one or more new codes, each of the one or more templates comprising a representation of at least a portion of the user account data including the additional user account data organized according to the predetermined categories and order rankings defined by one or more of the codes.

Another aspect of the embodiments of the present disclosure is a method of generating a custom template. The method may comprise importing user account data, the user account data including a plurality of user-defined account identifiers, and receiving a user input on a graphical user interface, the user input including a mapping of the plurality of user-defined account identifiers to predetermined categories, the user input further including a selected ordering of two or more of the user-defined account identifiers that are mapped to the same one of the predetermined categories. The method may further comprise, for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category. The method may further comprise generating one or more templates based on the plurality of codes, each of the one or more templates comprising a representation of at least a portion of the user account data organized according to the predetermined categories and order rankings defined by one or more of the codes.

The graphical user interface may comprise a hierarchical listing of the predetermined categories and a listing of the plurality of user-defined account identifiers, the user input being defined at least in part by one or more user interactions with the graphical user interface that designate positions in the hierarchical listing for the listed user-defined account identifiers.

The method may comprise, after the generating of the one or more templates, importing additional user account data, the additional user account data including one or more additional user-defined account identifiers, and receiving an additional user input on the graphical user interface, the additional user input including a mapping of the one or more additional user-defined account identifiers to the predetermined categories, the additional user input further including a selected ordering of the one or more additional user-defined account identifiers that are mapped to the same one of the predetermined categories as another of the user-defined account identifiers. The method may comprise, for each of the one or more additional user-defined account identifiers, generating a new code based on the additional user input, the new code defining the predetermined category to which the additional user-defined account identifier is mapped and an order ranking of the additional user-defined account identifier relative to any others of the user-defined account identifiers that are mapped to the same predetermined category. The method may comprise regenerating the one or more templates based on the plurality of codes including the one or more new codes, each of the one or more templates comprising a representation of at least a portion of the user account data including the additional user account data organized according to the predetermined categories and order rankings defined by one or more of the codes.

Another aspect of the embodiments of the present disclosure is a system for generating a custom template. The system may comprise a data source integrator for importing user account data, the user account data including a plurality of user-defined account identifiers, and an electronic device having a display screen for displaying a graphical user interface that accepts a user input, the user input including a mapping of the plurality of user-defined account identifiers to predetermined categories, the user input further including a selected ordering of two or more of the user-defined account identifiers that are mapped to the same one of the predetermined categories. The system may further comprise a code generator that generates a code for each of the user-defined account identifiers based on the user input, the code defining the predetermined category to which the user-defined account identifier is mapped and an order ranking of the user-defined account identifier relative to any others of the user-defined account identifiers that are mapped to the same predetermined category. The system may further comprise a template generator for generating one or more templates based on the plurality of codes, each of the one or more templates comprising a representation of at least a portion of the user account data organized according to the predetermined categories and order rankings defined by one or more of the codes.

The graphical user interface may comprise a hierarchical listing of the predetermined categories and a listing of the plurality of user-defined account identifiers, the user input being defined at least in part by one or more user interactions with the graphical user interface that designate positions in the hierarchical listing for the listed user-defined account identifiers.

The system may comprise a data warehouse for storing the plurality of codes. The template generator may receive a request for a template model from among a plurality of template models available in a user-browsable marketplace and customize the template model according to the plurality of codes stored in the data warehouse.

The data source integrator may be operable to import the user account data from one or more data sources including an Enterprise Resource Planning (ERP) system.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for custom template generation using a universal code, including but not limited to those described in relation to an exemplary cloud-based financial software solution described herein. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The exemplary cloud-based financial software solution that may embody one or more of the disclosed embodiments may be regarded as belonging to a software category most often referred to as Corporate Performance Management (CPM) software. CPM solutions integrate with Enterprise Resource Planning (ERP) systems to import financial dimensions such as company, general ledger (GL) accounts, etc. and financial data such as revenues, expenses, assets, liabilities, and equity. CPM solutions store this information in their database (which may be referred to as a "Data Warehouse"). A trained consultant or customer may then use these dimensions and data to deliver:

1) Financial reports such as different variations of Trial Balances, Profit & Loss reports, and Balance Sheets;
2) Planning models with web-based input forms to capture budget and forecast data and with workflow for approvals, rejections, etc.; and
3) Dashboards that provide managers with graphical analysis of their data.

In summary, companies and organizations use CPM software to automate and simplify their financial reporting, budgeting, and forecasting processes. The target users exist in all industries and they are typically CFOs, controllers, and budget managers in a business's office of finance. When it gets too cumbersome to build and maintain financial reports, budget models, and dashboards within their ERP system or in their homegrown spreadsheets, such target users typically purchase and implement a CPM solution like the exemplary cloud-based financial software solution contemplated herein.

Figure 1:
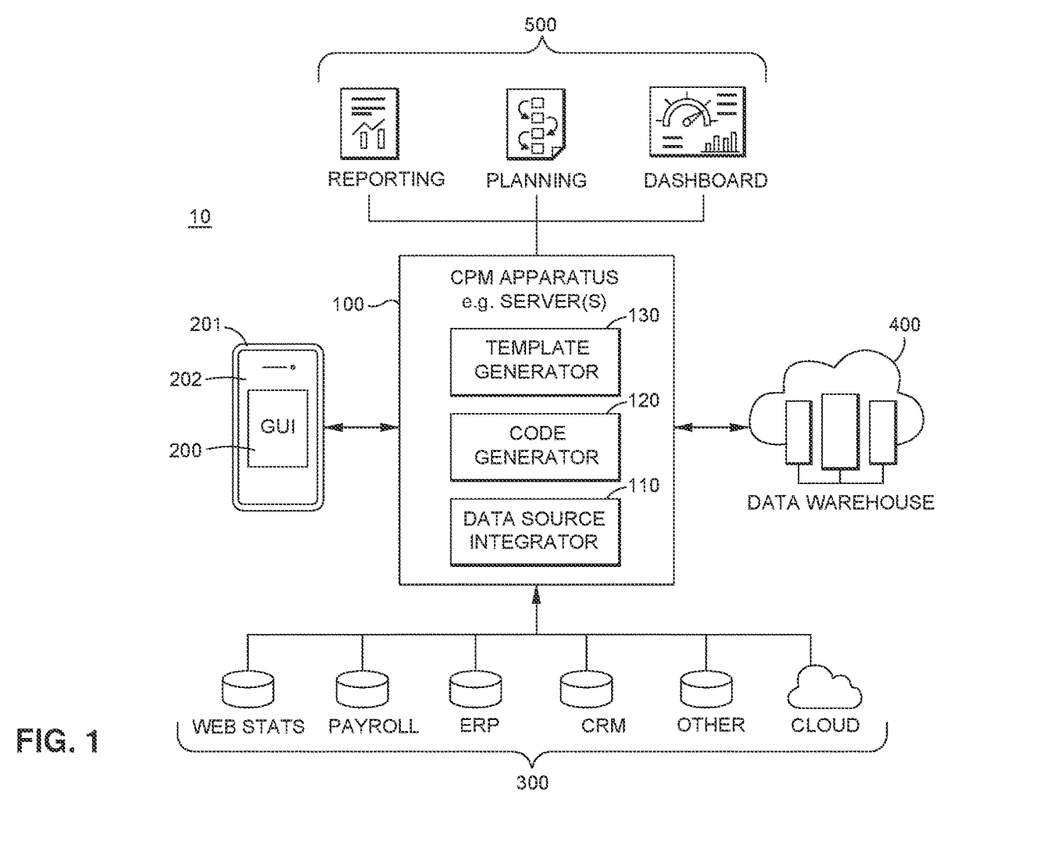
FIG. 1 shows an example system for generating a custom template according to an embodiment of the present disclosure.

FIG. 1 shows an example system 10 for generating a custom template according to an embodiment of the present disclosure. The system 10 may embody one or more aspects of the envisioned cloud-based financial software solution described herein, in particular as pertains to importing user account data and generating one or more templates that may include financial reports, planning models, and dashboards as described above. In this regard, the system 10 may include a CPM apparatus 100 that may be a server or a combination of networked servers that communicate with a user of the system 10 over a graphical user interface (GUI) 200 accessible via a web browser or mobile application of an electronic device 201 (e.g., a user's smartphone, tablet, or personal computer), as well as communicating with various data sources 300 (e.g., ERP systems, web stats, payroll, CRM, or other systems, including cloud-based systems) and with a data warehouse 400 (e.g., one or more databases). Unlike conventional CPM software, the disclosed CPM apparatus 100 may generate a standardized code for each item of imported user account data based on a mapping and ordering of the data as input by a company's CFO or other user of the GUI 200. Based on the imported user account data from one or more data sources 300 and the codes generated in association therewith, the CPM apparatus 100 may automatically generate and update financial reports, planning models, dashboards, and other templates as may be selected by the user from a marketplace 500 of template models.

Figure 2:
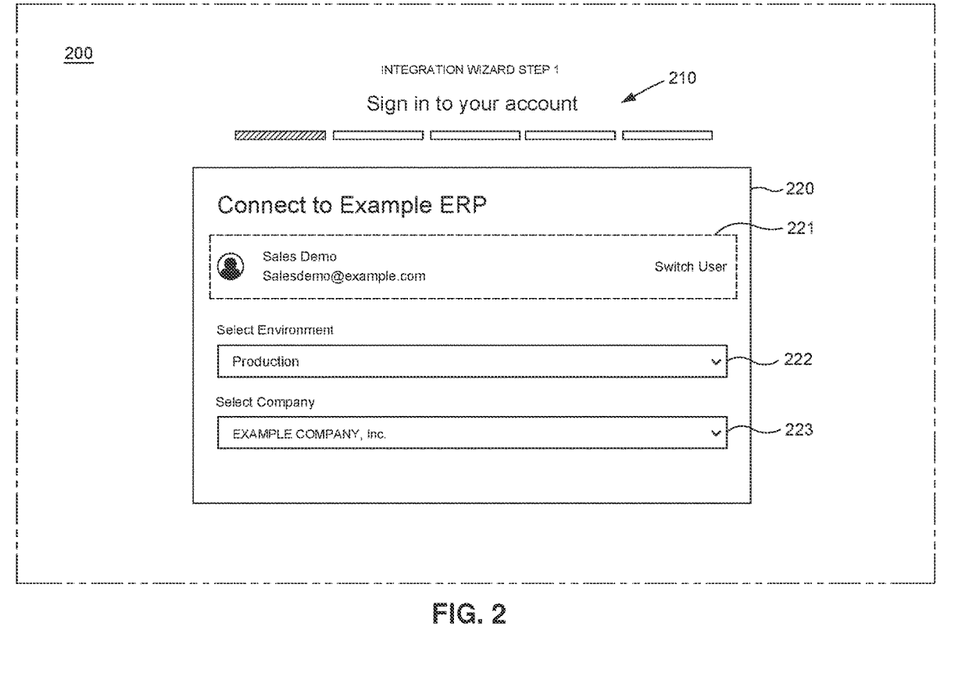
FIG. 2 shows an example view of a graphical user interface (GUI) that may be accessible by an electronic device of the system.

FIGS. 2 through 6 show example views of the GUI 200 that may be accessible on a display screen 202 of the user's smartphone or other electronic device 201. Referring first to FIG. 2, an example data import page of the GUI 200 is shown. A user of the GUI 200 may arrive at the data import page shown in FIG. 2 following login and/or navigation using a web browser or mobile application on the electronic device 201. The data import page may include a process flow indicator 210 showing the current stage of the process ("INTEGRATION WIZARD STEP 1—Sign in to your account") and the relative position of the current stage within the process of generating a custom template (e.g., first of five rectangular bars). The sequence of steps making up this process and exemplified by the GUI 200 may define a wizard or other guided process included as a feature of a website or mobile application, an example of which is an integration wizard that streamlines out-of-the-box integrations and general ledger (GL) account mapping enabling ready-to-use templates. Such a wizard may be native functionality of a cloud-based CPM platform or other embodiment of the CPM apparatus 100 and may be used by a new customer/user as part of an initial configuration of the system 10 for that user. It is contemplated that the entire process represented by FIGS. 2 through 6, from importing data to generating customized templates, may take as little as two hours.

In substantive part, the data import page shown in FIG. 2 may include a data source selection tool 220 by which the user may connect an external data source 300 to the CPM apparatus 100. The data source selection tool 220 may be implemented using an access delegation standard such as OAuth, for example, which may allow for the secure input of login credentials to grant the CPM apparatus 100 authorization to access third party ERP systems and other data sources 300. An ERP data source may typically be the most important one for the CPM apparatus 100 because it holds the company's financial data. In the example of FIG. 2, the user has logged in to a fictional ERP system called "Example ERP." The user's account information (e.g., account name "Sales Demo," email address, etc.) may be displayed in a login tool 221, which may include means for switching user, logging out, etc. Depending on the particular ERP system or other data source 300, one or more additional selectors 222, 223 may be included in the data source selection tool 220 for further refining the selection of the data source 300 to be connected to the CPM apparatus 100. For this particular ERP system, for example, the data source selection tool 220 includes an environment selector 222 and a company selector 223, with which the user has selected the "Production" environment and "EXAMPLE COMPANY, Inc." company associated with the desired data source 300.

Referring back to FIG. 1, the CPM apparatus 100 may include a data source integrator 110 for importing user account data. The data source integrator 110 may import the user account data from the one or more data sources 300, which may be connected to the CPM apparatus 100 as described above using the data import page of the GUI 200 shown in FIG. 2, for example. In addition to the actual financial data including, e.g., revenues, expenses, assets, liabilities, equity, etc., the imported user account data may include a plurality of user-defined account identifiers which may represent financial dimensions of the company and may include, for example, category codes or names (e.g., "CURRENTASSE") as well as category descriptions identifying the meaning of each category name in a longer human-understandable form (e.g., "Current Assets"). The data source integrator 110 may store the imported user account data in the data warehouse 400 (e.g., in association with the particular user of the CPM apparatus 100 who is logged in to the GUI 200). It is contemplated that data source fields may be pre-mapped by the data source integrator 110 so that the imported user account data may be initially organized according to a standard schema in the data warehouse 400.

Figure 3:
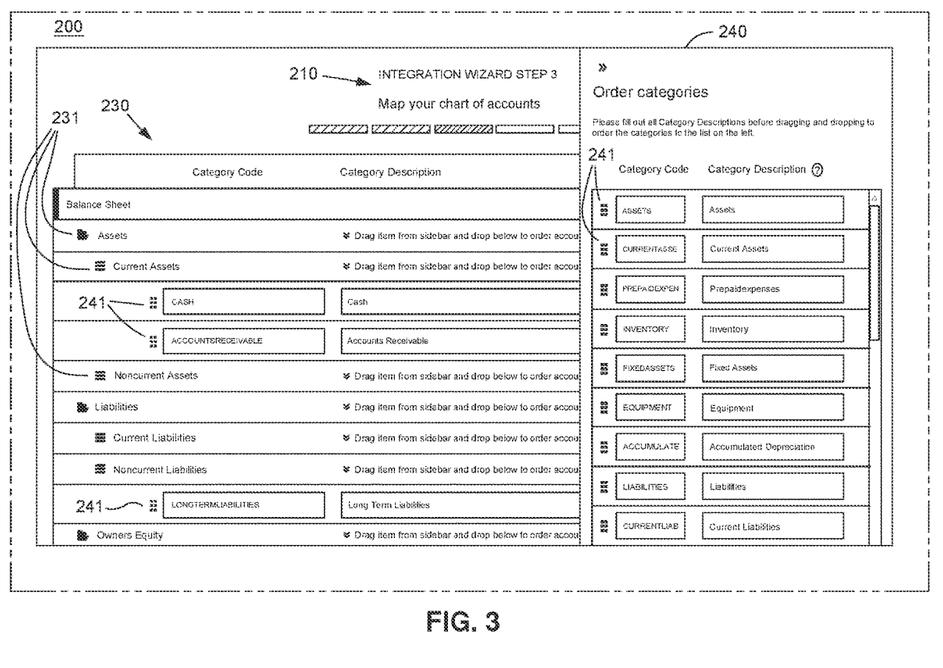
FIG. 3 shows another example view of the GUI.
Figure 4:
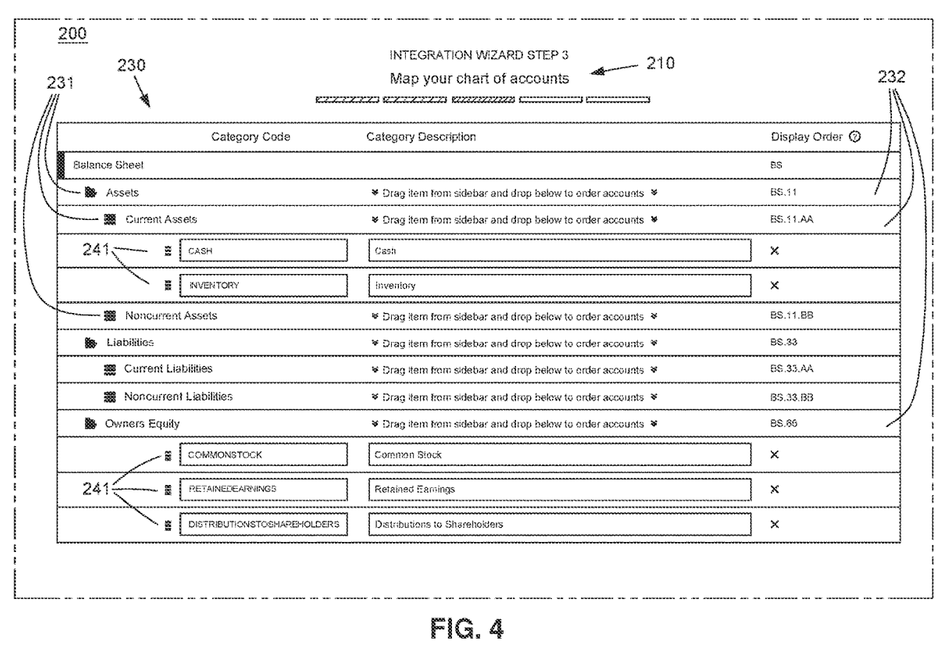
FIG. 4 shows another example view of the GUI.
Figure 5:
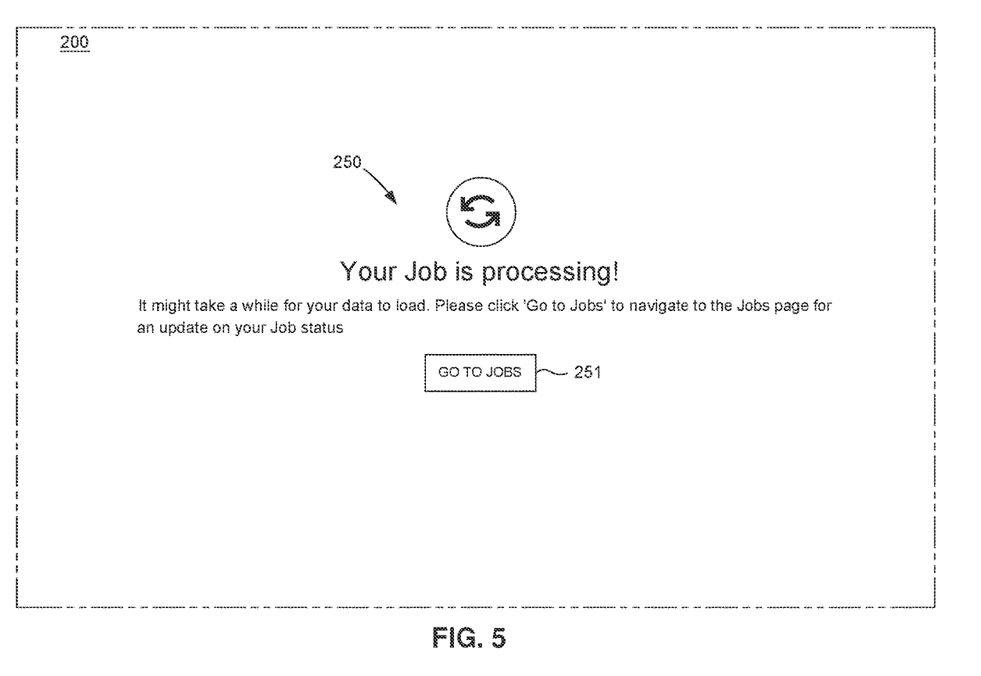
FIG. 5 shows another example view of the GUI.

FIGS. 3 and 4 show an example mapping page of the GUI 200, which may be arrived at by the user of the GUI 200 at a later stage in the process as depicted by the process flow indicator 210 ("INTEGRATION WIZARD STEP 3—Map your chart of accounts"). The main portion of the mapping page may comprise a mapping tool 230, which may display a hierarchical listing of predetermined categories 231. The predetermined categories 231 may be defined by the CPM apparatus 100 for use with template models available in the marketplace 500, for example, and may represent a standardized set of categories defined universally for use by a variety of different customers/users in connection with different businesses. As illustrated in FIG. 3, the GUI 200 may use an indented tree structure to differentiate positions in the hierarchical listing that are at different hierarchical levels. For example, the predetermined categories 231 may include a "Current Assets" category and a "Noncurrent Assets" category that fall hierarchically within the broader "Assets" category, which may in turn fall within the broader "Balance Sheet" category, as denoted by their respective indentations in the indented tree structure. Further below (not shown), the indented tree structure may continue with a "Profit & Loss" category and various hierarchical subcategories therein, etc. Alternatively, different high-level categories such as "Balance Sheet" and "Profit & Loss" may be presented as entirely separate tree structures.

As shown in FIG. 3, the mapping page of the GUI 200 may further comprise a listing of the plurality of user-defined account identifiers 241, which may be retrieved by the CPM apparatus 100 from the data warehouse 400 after having been imported by the data source integrator 110 (e.g., loaded from the customer's ERP system) as described above. Each user-defined account identifier 241 may be listed using its respective category code or name (e.g., "CURRENTASSE") and/or category description (e.g., "Current Assets") as described above. In general, a user-defined account identifier 241 may comprise one or more of an account name, an account category name, an account category description, and an account category code, for example. The listing of user-defined account identifiers 241 may be displayed in a user account editing tool 240. It is contemplated that the user account editing tool 240 may allow the user to enter a change to a code/name or description associated with any of the user-defined account identifiers 241 using the GUI 200, which may result in a corresponding update to the user account data stored in the data warehouse 400. The user account editing tool 240 may be displayed on the same page as the mapping tool 230 and may be a collapsible pane as shown (expanded in FIG. 3, collapsed and thus not visible in FIG. 4), a pop-up window, etc.

Using the mapping page of the GUI 200, the user may map each user-defined account identifier 241 to a corresponding one of the predetermined categories 231, for example, by designating a position in the hierarchical listing for each user-defined account identifier 241. To this end, one contemplated user interaction with the GUI 200 is a drag-and-drop interaction to move one of the listed user-defined account identifiers 241 directly from the user account editing tool 240 to a position in the hierarchical listing corresponding to the desired category 231. As shown, for example, the user has dragged the "CASH" and "ACCOUNTSRECEIVABLE" account identifiers 241 to the "Current Assets" category 231 and has dragged the "LONGTERMLIABILITIES" account identifier 241 to the "Noncurrent Liabilities" category 231. It is contemplated that those user-defined account identifiers 241 that have already been moved to a desired position in the hierarchical listing of predetermined categories 231 may be removed from the listing of user-defined account identifiers 241 accordingly (i.e., removed from the user account editing tool 240) or may be grayed out or otherwise clearly indicated as having been already assigned to categories 231 by the user. In this way, the user may easily see which user-defined account identifiers 241 remain to be assigned to predetermined categories 231 and may work through the list of user-defined account identifiers 241 quickly and without confusion.

Each assignment of a user-defined account identifier 241 to a given predetermined category 231 may be thought of, from the user's perspective, as effectively telling the CPM apparatus 100 where to populate the associated financial data in any given reporting, planning, or dashboard template. For example, a balance sheet template may have a "Current Assets" portion that corresponds to the "Current Assets" category 231. By assigning the "CASH" and "ACCOUNTSRECEIVABLE" account identifiers 241 to the "Current Assets" category 231 as shown in FIG. 3, the user may instruct the CPM apparatus 100 to put the financial data associated with these accounts in the "Current Assets" portion of any balance sheet template that is later generated. In the case of two or more user-defined account identifiers 241 being assigned to the same predetermined category 231 (as in "CASH" and "ACCOUNTSRECEIVABLE" being assigned to "Current Assets" in FIG. 3), it is further contemplated that the user input to the GUI 200 may further include a selected ordering of the two or more user-defined account identifiers 241 that are mapped to the same one of the predetermined categories 231. The user may, for example, freely switch the ordering of "CASH" and "ACCOUNTSRECEIVABLE" (e.g., by dragging and dropping on the GUI 200) so that the preferred account appears first. When a template (such as a balance sheet template) calls for user account data mapped to the "Current Assets" category 231, the user account data may appear on the template according to the selected ordering. In this way, the user may effectively customize the presentation of user account data in any template so that it prioritizes accounts in a way that matches the chart of accounts (COA) of the user's business.

Referring now to FIG. 4, the mapping page of the GUI 200 is again shown, this time with the user account editing tool 240 collapsed or otherwise not visible and the "Display Order" heading shown. The user may have finished mapping the user-defined account identifiers 241 to the predetermined categories 231, for example, and thus closed the user account editing tool 240. As can be seen under the "Display Order" heading, the mapping page may include a code corresponding to each category 231. In the illustrated example, the "Balance Sheet" category corresponds to the code "BS," the "Assets" category corresponds to the code "BS.11," the "Current Assets" category corresponds to the code "BS.11.AA," the "Noncurrent Assets" category corresponds to the code "BS.11.BB," etc. Each code may include one or more mapping code segments (e.g., "BS" or "11"), which may serve to specify the respective hierarchical level(s) associated with the predetermined category 231 that is defined by the code. So, for example, the "AA" segment and the "BB" segment in the codes "BS.11.AA" and "BS.11.BB" may specify that "Current Assets" appears before "Noncurrent Assets" (AA being before BB alphabetically) within the higher level "Assets" category having the "BS.11" code. Likewise, the "11" segment and the "33" segment in the codes "BS.11" and "BS.33" may specify that "Assets" appears before "Liabilities" within the higher level "Balance Sheet" category having the "BS" code. The mapping code segments may be separated by periods as shown (e.g., for readability) or may simply be a predefined length such as two digits, without requiring any separation character to parse the code.

For each of the user-defined account identifiers 241 that has been mapped to a predetermined category 231, a code generator 120 of the CPM apparatus 100 (see FIG. 1) may generate such a code based on the mapping and selected ordering of the user-defined account identifier 241 as described above. In particular, the generated code for each user-defined account identifier 241 may define the predetermined category 231 to which the user-defined account identifier 241 has been mapped and an order ranking of the user-defined account identifier 241 relative to any others of the user-defined account identifiers 241 that are mapped to the same predetermined category 231. By way of example, based on the mapping shown in FIG. 4, the "CASH" and "INVENTORY" account identifiers 241 may be given codes beginning with "BS.11.AA" to indicate that they are hierarchically within the "Current Assets" category 231. For example, the code "BS.11.AA.0005" may be generated for the user's "CASH" account identifier 231 and the code "BS.11.AA.0010" may be generated for the user's "INVENTORY" account identifier 231. Along the same lines, the codes "BS.66.0005," "BS.66.0010," and "BS.66.0015" may be generated corresponding respectively to the user's "COMMONSTOCK," "RETAINEDEARNINGS," and "DISTRIBUTIONSTOSHAREHOLDERS" account identifiers 231, with the result being that these three account identifiers 231 may fall within the hierarchy of categories 231 at a sub-level of "Owners Equity" (code "BS.66"). By differentiating user-defined account identifiers 241 that are mapped to the same category 231 using one or more ordering code segments (e.g., "0005") that specify an order ranking of the codes, the user's selected ordering of account identifiers 241 within each category 231 may be preserved in any subsequently generated template(s). The selected ordering may be dictated by a numerical or alphabetical ordering of the ordering code segments, for example: 0005 then 0010 then 0015. Each code, included ordering code segments, may be automatically generated by the code generator 120 as the user maps the user-defined account identifiers 241 to the predetermined categories 231 using the GUI 200. The CPM apparatus 100 may store the generated codes in the data warehouse 400 in association with the corresponding user-defined account identifier 241 (and thus in association with any financial or other user account data having that identifier 241).

One of the results of the mapping page described herein is that the generated codes may tell the various contemplated pre-built reports, dashboards and budget forms if a given item should be placed, for example, in the "Current Assets" section of the template or in the "Noncurrent Assets" section. Moreover, and by way of example, if one account category is "Cash" and another one is "Accounts Receivable," one customer may want to list "Cash" before "Accounts Receivable" in their templates (reports, dashboards, budget forms) while another customer may want to place "Accounts Receivable" before "Cash." With conventional technology, this difference in order represents a major impediment to using prebuilt templates that work immediately after a customer has started using the CPM product. With it being very normal for a company's general ledger (GL) (typically the key module in an ERP system) to include forty or fifty account categories, it is, conventionally, close to impossible to build libraries of templates that work out of the box for any company in any country. The mapping and code generating functionality described herein completely and elegantly solves this big problem, allowing the disclosed system 10 to deliver in just a few hours what in the industry typically might take twenty or more days of consulting just to build/adjust templates to fit each customer's preferences of which sections (account categories) to place where in their financial templates.

While the importing of user-defined account identifiers 241 into the CPM apparatus 100 from an ERP system or other data source 300 may be relatively quick (or even substantially instantaneous), the actual financial data included in the user account data (e.g., revenues, expenses, assets, liabilities, equity, etc.) may take significant time to import due to the large size of the data. Therefore, a loading page such as the one shown in FIG. 5 may be displayed on the GUI 200 to inform the user that data is still being imported. It is contemplated, however, that the data source integrator 110 may first import the user-defined account identifiers 241 before completing the import of the remainder of the user account data, allowing the user to map the user-defined account identifiers 241 to the predetermined categories 231 using the mapping page of FIGS. 3 and 4 while the import of the financial data is still ongoing. Depending how long it takes the user to complete the mapping of accounts, and depending on the size of the data, in some cases the user may experience no wait time at all during the loading of the user account data into the data warehouse 400. The import may be underway in the background during the mapping process and may quietly complete during this time. On the other hand, if the user finishes mapping early and the import is not yet complete, the GUI 200 may navigate to the loading page shown in FIG. 5 after the mapping page of FIGS. 3 and 4, for example. The loading page may include an import status button 251 ("GO TO JOBS"), by which the user may navigate to a further page of the GUI 200 (not shown) for viewing, pausing, and/or prioritizing one or more ongoing import jobs that may be displayed with associated upload speeds and progress bars showing the size of the upload, estimated time remaining, etc.

Figure 6:
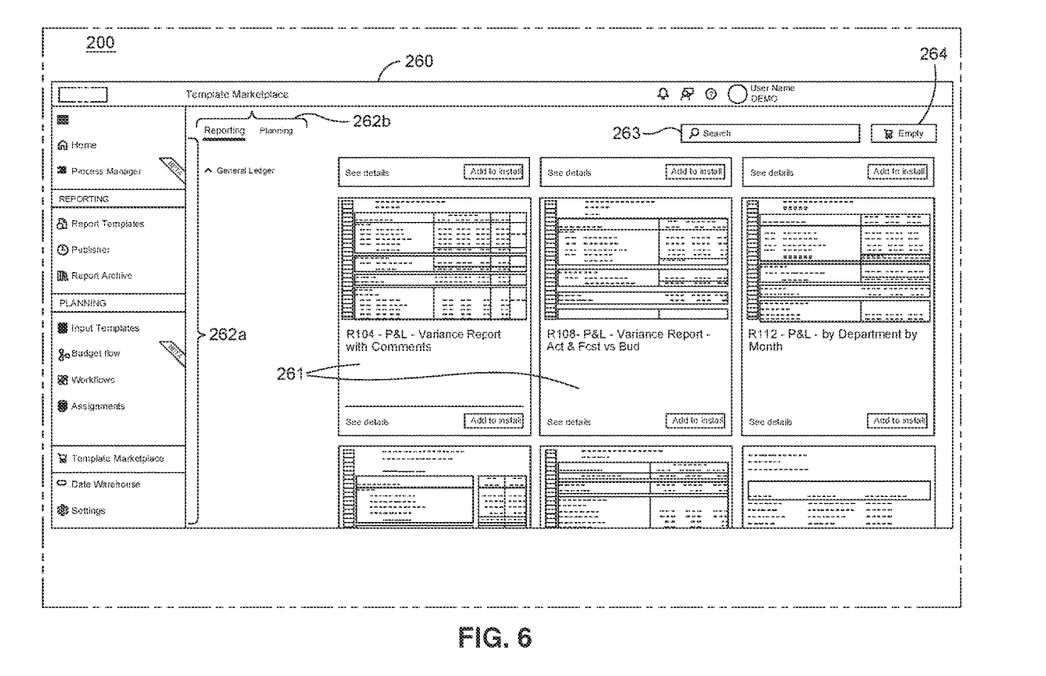
FIG. 6 shows another example view of the GUI.

FIG. 6 shows an example template marketplace page of the GUI 200. Once the user has completed the mapping of the user-defined account identifiers 241 to the predetermined categories 231 as described above (see FIGS. 3 and 4) and the user account data including financial data has finished being loaded into the data warehouse 400 (see FIGS. 2 and 5), the user may complete the process by selecting any report/form/dashboard template that they want from the marketplace 500 using a template selector 260 displayed on the template marketplace page shown in FIG. 6. The template selector 260 may, in substantive part, include a listing of template models 261 such as "P&L—Variance Report with Comments," "P&L—Variance Report—Act & Fcst vs Bud," and "P&L—by Department by Month," which may have respective template model numbers (e.g., R104, R108, and R112). Each of the template models 261 may be presented in summary form as shown, with template model name and number and a preview image illustrating what the generated template looks like. Each template model 261 may further be presented with a link ("See details") to another page where more detailed information about the template model 261 can be seen. A button marked "Add to install," "Add to cart," "Buy," or the like may be provided as well, which the user may use to complete a selection of a template model 261 for purchase and/or download. It is contemplated that access to template models 261 may be subscription-based or may be a la carte, for example. The template selector 260 may additionally include marketplace navigators 262a, 262b to aid the user in browsing the template marketplace 500 as well as a search bar 263 for locating a specific kind of template model 261. A checkout button 264 may navigate the GUI 200 to a shopping cart or other page for finalizing a purchase/download when the user is ready to do so.

The above-described process of mapping user-defined account identifiers 241 to predetermined categories 231 results in the generation of codes that are assigned by the CPM apparatus 100 to each user-defined account identifier 241. Thereafter (and/or retroactively), as financial and other user account data is imported into the data warehouse 400 by the data source integrator 110, any data that is associated with one of the mapped account identifiers 241 will automatically be assigned the corresponding code by the CPM apparatus 100. Referring back to FIG. 1, a template generator 130 of the CPM apparatus 100 may then use these intelligent codes to automatically design and generate templates that work without any modifications. The code may tell the template generator 130 i) exactly which predetermined (generic) category 231 each imported item of data should be regarded as belonging to for purposes of populating a template, as well as ii) how to order the data within the template to suit the preferences of the user and match the user's own COA. To this end, each template model 261 may include one or more data sections that are keyed to the various predetermined categories 231 defined within the system 10. For example, a table in a template model 261 may call for a listing of financial data that is categorized as belonging to the "Current Assets" category 231, or a graph in a template model 261 may call for a calculation of a function on financial data that is categorized as belonging to the "Expenses" category 231. Because the code assigned to a given data item of the user's financial data references one of the predetermined categories 231, the template generator 130 is able to populate the data sections of each template with the correct financial data. At the same time, based on the ordering code segments (e.g., "0005" and "0010" in the example codes BS.11.AA.0005 and BS.11.AA.0010), the template generator 130 may create subsections within the template and order them accordingly. For example, in the case of the codes BS.11.AA.0005 and BS.11.AA.0010, the template generator 130 may create subsections for the user's "CASH" and "INVENTORY" accounts (ordered as specified by the ordering code segments) in the "Current Assets" section of any generated template that pulls data mapped to the "Current Assets" category 231.

The set of pre-built financial templates (e.g., financial reports, budget/forecast templates, and dashboards) that may be available in the marketplace 500 via the template marketplace page of the GUI 200 may include any number of templates, for example, ten or more financial report templates, two or more general ledger (GL) budget forms, two or more GL forecast forms, and fifty or more power business intelligence (BI) financial dashboards. Due to the disclosed technology, including the generation of intelligent codes as described above, the contemplated integration wizard or other setup procedure of the system 10 may enable pre-built templates that work immediately with no modification or customization needed, regardless of how the customer business's accounts and account categories are set up in its ERP system. This may dramatically reduce implementation time of such templates from twenty days or more (part of the typical 2-3 month CPM implementation projects) down to approximately two hours or less. Related to this major efficiency gain in implementation time are also additional benefits of significantly reducing consulting cost and risk (of poorly designed models) and requiring implementers to have much less skill.

Figure 7:
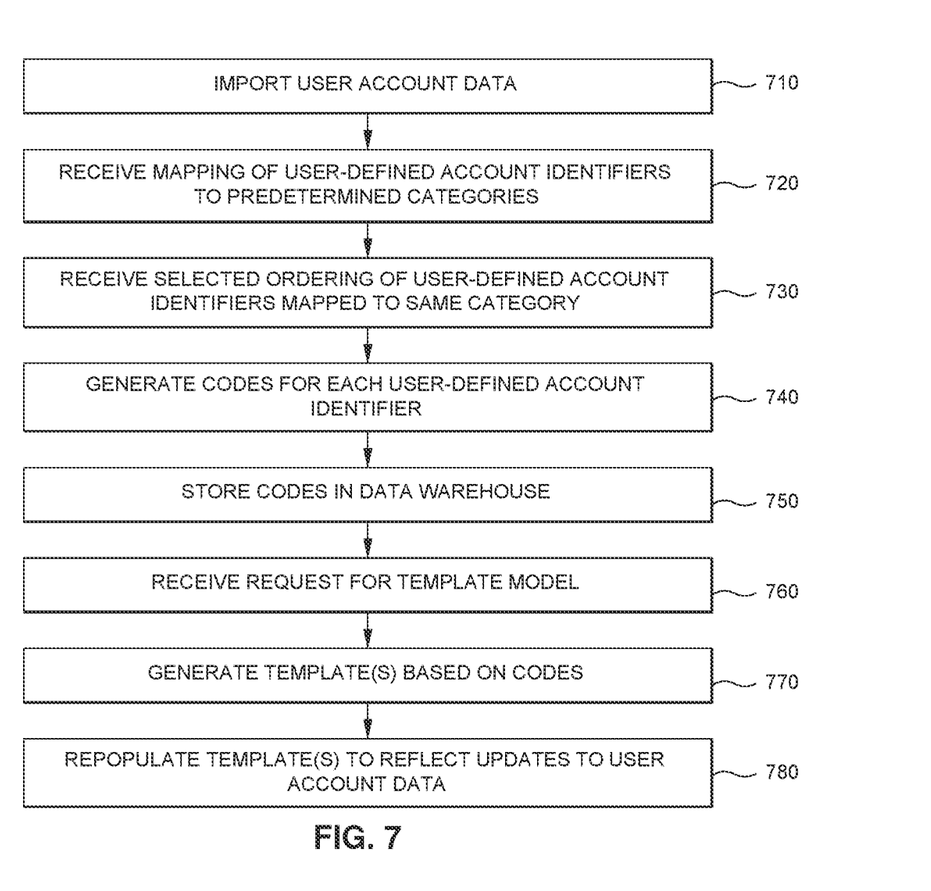
FIG. 7 shows an example operational flow according to an embodiment of the present disclosure.

FIG. 7 shows an example operational flow according to an embodiment of the present disclosure. The operational flow of FIG. 7 may be performed, in whole or in part, by one or more elements of the system 10 shown and described in relation to FIGS. 1-6. In particular, the operational flow may be performed by the CPM apparatus 100 as may be embodied by one or more servers in communication with the electronic device 201 (e.g., via a mobile app or web browser), one or more data sources 300, and the data warehouse 400. The operational flow may begin with importing user account data (step 710). For example, in response to an instruction from a CFO or other user of the system 10 (e.g., on a data import page of the GUI 200 as shown in FIG. 2), the data source integrator 110 of the CPM apparatus 100 may import user account data including financial data as well as a plurality of associated user-defined account identifiers 241 (see FIG. 3) from the user's ERP system and/or other data source(s) 300. Once the user-defined account identifiers 241 have been imported (and stored in the data warehouse 400, for example), the operational flow of FIG. 7 may continue with receiving a mapping of the user-defined account identifiers 241 to predetermined categories 231 (step 720) and receiving a selected ordering of any two or more user-defined account identifiers 241 that are mapped to the same category 231 (step 730). For example, the CPM apparatus 100 may receive a user input on a mapping page of the GUI 200 as shown in FIG. 3, where the user input (e.g., a drag-and-drop operation) specifies the user's desired mapping and selected ordering.

For each user-defined account identifier 241, a code may be generated based on the user input (step 740) and stored in the data warehouse 400 (step 750). For example, the code generator 120 of the CPM apparatus 100 may generate alphanumeric codes as described above (e.g., "BS.11.AA.0005"), which may contain information specifying both the mapping of the user-defined account identifier 241 to a predetermined category 231 and any selected ordering of the user-defined account identifier 241 in relation to other user-defined account identifiers 241 that are mapped to the same category 231. As each code is stored in the data warehouse 400, any already-existing or later-imported user account data (e.g., financial data) having the user-defined account identifier 241 associated with that code will automatically be earmarked for appropriate placement in any reporting, planning, or dashboard templates (i.e., in the correct category 231 and with the selected ordering). Thus, when a request for a template model 261 is later received (step 760), which may be made over the template marketplace page of the GUI 200 shown in FIG. 6, for example, the operational flow may proceed with generating a template based on the codes stored in the data warehouse 400 (step 770). The generated template may be a populated version of the selected template model 261, i.e., one with all of the various fields and data sections (including graphs and other visualizations) filled in with relevant user account data. In particular, the template generator 130 of the CPM apparatus 100 may generate a template that represents at least a portion of the imported user account data organized according to the predetermined categories 231 and order rankings defined by one or more of the codes. In this way, the template generator 130 may automatically customize the selected template model 261 according to the plurality of codes stored in the data warehouse 400.

The above steps 710-750 may represent an initial setup of the system 10 for use by a particular user (such as a CFO of a business that is a customer of an entity operating the disclosed system 10), with steps 760 and 770 representing an initial generation of template(s) by the user, either as part of or subsequent to the initial setup. At a later time, the user account data will change as new financial data becomes available (e.g., each day, quarter, etc.), without necessarily entailing any changes to the business's COA and thus without necessarily requiring any update to the mapping of the user-defined account identifiers 241 to the predetermined categories 231 referenced by the templates. To illustrate this, the operational flow of FIG. 7 may further include repopulating one or more of the templates to reflect updates to user account data (step 780). For example, after one or more templates have already been generated in step 770, the data source integrator 110 may import additional user account data (e.g., by re-executing step 710 for the new data). Automatically, and/or in response to a user input to the GUI 200, the templates may be repopulated to reflect the new data. Such simple repopulating may be performed periodically at predetermined times, for example (e.g., every day, every quarter). In other cases, the additional user account data may include not only new financial data but one or more additional user-defined account identifiers 241, such as if the user's business has reorganized accounts or introduced new accounts or financial dimensions. In this case, step 780 may be preceded not only by a re-execution of step 710 for the new data but by a subsequent re-execution of steps 720-750 to generate new codes reflecting the mapping and/or ordering of the additional user-defined account identifiers 241. Step 780 may, in such cases, comprise regenerating the one or more templates based on the plurality of codes stored in the data warehouse 400 including the one or more new codes.

One of the key reasons that it takes weeks or months for conventional CPM software companies to implement their solutions is that all customers create their own COA in their ERP system and they keep adding more such account numbers in their COA during the lifespan of their ERP system. With the mapping and underlying automatic and intelligent numbering technology described herein, the forms/reports/dashboards of the disclosed systems and methods may work without any modification and will keep working even if customers add new account numbers in their ERP. In this regard, it should be noted that the implementation of CPM software using conventional technology may take two to three months, with a related consulting bill of $50,000-$150,000. Even small, basic implementations rarely take less than three to four weeks and typically require $20,000-$25,000 in consulting services, where most time is spent on designing reports, planning input forms and dashboards. The disclosed system 10 can eliminate this implementation time for creating templates, allowing the report/planning/dashboard templates to work out-of-the-box without any modification rather than having to build templates from scratch for each customer or modify templates to tailor them to the customer's unique account numbers and preferred ordering of sections in financial statements and budget input templates. As a result, by using the disclosed technology, implementation time to deliver reports/planning forms/dashboards may be a fraction of the normal time and with none of the design/error risk associated with custom designed templates. Moreover, the skillset needed to get up and running (integration, data loading and report/form/dashboard template design) may be much less than other CPM tools because the disclosed system 10 enables pre-built templates (whereas template design is always one of the most technical aspects of a CPM tool). Implementation and training costs can thus be dramatically reduced in comparison to what is typical in the industry for CPM software products.

The functionality described above in relation to the components of the system 10, including the CPM apparatus 100, data source integrator 110, code generator 120, template generator 130, and mobile app or website for presenting the GUI 200 as shown in FIGS. 1-6, as well as the operational flow described in relation to FIG. 7 and throughout the disclosure, may be wholly or partly embodied in one or more computers including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet), such as between the electronic device 201 and one or more servers embodying the CPM apparatus 100 or between one or more servers embodying the CPM apparatus 100 and one or more computers/databases embodying any of the data sources 300, the data warehouse 400, the template marketplace 500, etc. To the extent that functionality may be performed at a server (rather than by a mobile app installed on the electronic device 201, for example), any server contemplated herein may comprise multiple physical servers and other computers that communicate with each other to perform the described functionality.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A computer program product comprising one or more non-transitory program storage media on which are stored instructions executable by one or more processors or programmable circuits to perform operations for generating a custom template, the operations comprising:
    importing user account data, the user account data including a plurality of user-defined account identifiers;
    receiving a user input on a graphical user interface, the user input including a mapping of the plurality of user-defined account identifiers to predetermined categories, the user input further including a selected ordering of two or more of the user-defined account identifiers that are mapped to the same one of the predetermined categories;
    for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category; and
    generating one or more templates based on the plurality of codes, each of the one or more templates comprising a representation of at least a portion of the user account data organized according to the predetermined categories and order rankings defined by one or more of the codes, each of the plurality of codes includes one or more mapping code segments specifying respective hierarchical levels associated with the predetermined category defined by the code, and an ordering code segment specifying the order ranking defined by the code.

2. The computer program product of claim 1, wherein the graphical user interface comprises a hierarchical listing of the predetermined categories and a listing of the plurality of user-defined account identifiers, the user input being defined at least in part by one or more user interactions with the graphical user interface that designate positions in the hierarchical listing for the listed user-defined account identifiers.

3. The computer program product of claim 2, wherein the one or more user interactions comprise a drag-and-drop interaction to move one of the listed user-defined account identifiers to a position in the hierarchical listing.

4. The computer program product of claim 2, wherein the graphical user interface uses an indented tree structure to differentiate positions in the hierarchical listing that are at different hierarchical levels.

5. The computer program product of claim 1, wherein the user input further includes a change to a name or description associated with one of the user-defined account identifiers.

6. The computer program product of claim 1, wherein the operations further comprise:
    storing the plurality of codes in a data warehouse; and
    receiving a request for a template model from among a plurality of template models available in a user-browsable marketplace,
    wherein said generating one or more templates comprises customizing the template model according to the plurality of codes stored in the data warehouse.

7. The computer program product of claim 6, wherein the plurality of template models includes one or more template models selected from the group consisting of financial reports, planning models, and dashboards.

8. The computer program product of claim 1, wherein the user account data is imported from one or more data sources including an Enterprise Resource Planning (ERP) system.

9. The computer program product of claim 1, wherein the plurality of user-defined account identifiers includes one or more user-defined account identifiers selected from the group consisting of an account name, an account category name, an account category description, and an account category code.

10. The computer program product of claim 1, wherein the operations further comprise repopulating the one or more generated templates to reflect updates to the user account data.

11. The computer program product of claim 10, wherein said repopulating is performed periodically at predetermined times.

12. The computer program product of claim 1, wherein the operations further comprise:
    after said generating one or more templates, importing additional user account data, the additional user account data including one or more additional user-defined account identifiers;

receiving an additional user input on the graphical user interface, the additional user input including a mapping of the one or more additional user-defined account identifiers to the predetermined categories, the additional user input further including a selected ordering of the one or more additional user-defined account identifiers that are mapped to the same one of the predetermined categories as another of the user-defined account identifiers;

for each of the one or more additional user-defined account identifiers, generating a new code based on the additional user input, the new code defining the predetermined category to which the additional user-defined account identifier is mapped and an order ranking of the additional user-defined account identifier relative to any others of the user-defined account identifiers that are mapped to the same predetermined category; and regenerating the one or more templates based on the plurality of codes including the one or more new codes, each of the one or more templates comprising a representation of at least a portion of the user account data including the additional user account data organized according to the predetermined categories and order rankings defined by one or more of the codes.

13. A method of generating a custom template, the method comprising:

importing user account data, the user account data including a plurality of user-defined account identifiers;

receiving a user input on a graphical user interface, the user input including a mapping of the plurality of user-defined account identifiers to predetermined categories, the user input further including a selected ordering of two or more of the user-defined account identifiers that are mapped to the same one of the predetermined categories;

for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category;

generating one or more templates based on the plurality of codes, each of the one or more templates comprising a representation of at least a portion of the user account data organized according to the predetermined categories and order rankings defined by one or more of the codes; and after said generating one or more templates, importing additional user account data, the additional user account data including one or more additional user-defined account identifiers;

receiving an additional user input on the graphical user interface, the additional user input including a mapping of the one or more additional user-defined account identifiers to the predetermined categories, the additional user input further including a selected ordering of the one or more additional user-defined account identifiers that are mapped to the same one of the predetermined categories as another of the user-defined account identifiers;

for each of the one or more additional user-defined account identifiers, generating a new code based on the additional user input, the new code defining the predetermined category to which the additional user-defined account identifier is mapped and an order ranking of the additional user-defined account identifier relative to any others of the user-defined account identifiers that are mapped to the same predetermined category; and regenerating the one or more templates based on the plurality of codes including the one or more new codes, each of the one or more templates comprising a representation of at least a portion of the user account data including the additional user account data organized according to the predetermined categories and order rankings defined by one or more of the codes.

14. The method of claim 13, wherein the graphical user interface comprises a hierarchical listing of the predetermined categories and a listing of the plurality of user-defined account identifiers, the user input being defined at least in part by one or more user interactions with the graphical user interface that designate positions in the hierarchical listing for the listed user-defined account identifiers.

15. A system for generating a custom template, the system comprising:

a data source integrator for importing user account data, the user account data including a plurality of user-defined account identifiers;

an electronic device having a display screen for displaying a graphical user interface that accepts a user input, the user input including a mapping of the plurality of user-defined account identifiers to predetermined categories, the user input further including a selected ordering of two or more of the user-defined account identifiers that are mapped to the same one of the predetermined categories;

a code generator that generates a code for each of the user-defined account identifiers based on the user input, the code defining the predetermined category to which the user-defined account identifier is mapped and an order ranking of the user-defined account identifier relative to any others of the user-defined account identifiers that are mapped to the same predetermined category;

a template generator for generating one or more templates based on the plurality of codes, each of the one or more templates comprising a representation of at least a portion of the user account data organized according to the predetermined categories and order rankings defined by one or more of the codes; and a data warehouse for storing the plurality of codes, the template generator receives a request for a template model from among a plurality of template models available in a user-browsable marketplace and customizes the template model according to the plurality of codes stored in the data warehouse.

16. The system of claim 15, wherein the graphical user interface comprises a hierarchical listing of the predetermined categories and a listing of the plurality of user-defined account identifiers, the user input being defined at least in part by one or more user interactions with the graphical user interface that designate positions in the hierarchical listing for the listed user-defined account identifiers.

17. The system of claim 15, further comprising a data warehouse for storing the plurality of codes, wherein the template generator receives a request for a template model from among a plurality of template models available in a user-browsable marketplace and customizes the template model according to the plurality of codes stored in the data warehouse.

18. The system of claim 15, wherein the data source integrator is operable to import the user account data from one or more data sources including an Enterprise Resource Planning (ERP) system.

19. A computer program product comprising one or more non-transitory program storage media on which are stored instructions executable by one or more processors or programmable circuits to perform operations for generating a custom template, the operations comprising:
   importing user account data, the user account data including a plurality of user-defined account identifiers;
   receiving a user input on a graphical user interface, the user input including a mapping of the plurality of user-defined account identifiers to predetermined categories, the user input further including a selected ordering of two or more of the user-defined account identifiers that are mapped to the same one of the predetermined categories;
   for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category; and
   generating one or more templates based on the plurality of codes, each of the one or more templates comprising a representation of at least a portion of the user account data organized according to the predetermined categories and order rankings defined by one or more of the codes;
   storing the plurality of codes in a data warehouse; and
   receiving a request for a template model from among a plurality of template models available in a user-browsable marketplace; and
   wherein said generating one or more templates comprises customizing the template model according to the plurality of codes stored in the data warehouse.

20. A computer program product comprising one or more non-transitory program storage media on which are stored instructions executable by one or more processors or programmable circuits to perform operations for generating a custom template, the operations comprising:
   importing user account data, the user account data including a plurality of user-defined account identifiers;
   receiving a user input on a graphical user interface, the user input including a mapping of the plurality of user-defined account identifiers to predetermined categories, the user input further including a selected ordering of two or more of the user-defined account identifiers that are mapped to the same one of the predetermined categories;
   for each of the user-defined account identifiers, generating a code based on the user input, the code defining the predetermined category to which the user-defined account identifier is mapped and an order ranking of the user-defined account identifier relative to any others of the user-defined account identifiers that are mapped to the same predetermined category;
   generating one or more templates based on the plurality of codes, each of the one or more templates comprising a representation of at least a portion of the user account data organized according to the predetermined categories and order rankings defined by one or more of the codes;
   after said generating one or more templates, importing additional user account data, the additional user account data including one or more additional user-defined account identifiers;
   receiving an additional user input on the graphical user interface, the additional user input including a mapping of the one or more additional user-defined account identifiers to the predetermined categories, the additional user input further including a selected ordering of the one or more additional user-defined account identifiers that are mapped to the same one of the predetermined categories as another of the user-defined account identifiers;
   for each of the one or more additional user-defined account identifiers, generating a new code based on the additional user input, the new code defining the predetermined category to which the additional user-defined account identifier is mapped and an order ranking of the additional user-defined account identifier relative to any others of the user-defined account identifiers that are mapped to the same predetermined category; and
   regenerating the one or more templates based on the plurality of codes including the one or more new codes, each of the one or more templates comprising a representation of at least a portion of the user account data including the additional user account data organized according to the predetermined categories and order rankings defined by one or more of the codes.

* * * * *